United States Patent [19]

Abe et al.

[11] Patent Number: 5,559,185

[45] Date of Patent: Sep. 24, 1996

[54] THERMOPLASTIC RESIN COMPOSITION

[75] Inventors: Hiroomi Abe; Taichi Nishio; Yasurou Suzuki; Mitsuji Tsuji; Takashi Sanada, all of Chiba, Japan

[73] Assignee: Sumitomo Chemical Company, Limited, Osaka, Japan

[21] Appl. No.: 372,863

[22] Filed: Jan. 13, 1995

Related U.S. Application Data

[63] Continuation of Ser. No. 102,226, Aug. 5, 1993, abandoned, which is a continuation of Ser. No. 472,643, Jan. 30, 1990, abandoned.

[30] Foreign Application Priority Data

Jan. 31, 1989 [JP] Japan ..................... 1-23179

[51] Int. Cl.$^6$ ............... C08L 71/12; C08L 25/06; C08L 13/02

[52] U.S. Cl. ............... 525/68; 525/69; 525/132; 525/133; 525/178; 525/240; 525/241; 525/391; 525/392; 525/397

[58] Field of Search ............... 525/68, 69, 132, 525/133, 178, 240, 241, 391, 392, 397

[56] References Cited

U.S. PATENT DOCUMENTS

| | | | |
|---|---|---|---|
| 3,379,792 | 4/1968 | Finholt . | |
| 4,315,086 | 2/1982 | Ueno et al. | 524/105 |
| 4,600,741 | 7/1986 | Aycock et al. | 524/139 |
| 4,654,405 | 3/1987 | Jalbert et al. | 525/391 |
| 4,659,760 | 4/1987 | van der Meer | 524/141 |
| 4,659,763 | 4/1987 | Gallucci et al. | 524/358 |
| 4,732,937 | 3/1988 | Sybert | 525/92 |
| 4,929,675 | 5/1990 | Abe et al. | 525/66 |
| 5,159,018 | 10/1992 | Nishio et al. | 525/132 |
| 5,262,478 | 11/1993 | Nishio et al. | 525/68 |

FOREIGN PATENT DOCUMENTS

| | | | |
|---|---|---|---|
| 046040 | 2/1982 | European Pat. Off. . | |
| 0236596 | 9/1987 | European Pat. Off. | 71/4 |
| 0270246 | 6/1988 | European Pat. Off. | 71/4 |
| 0295103 | 12/1988 | European Pat. Off. . | |
| 0299619 | 1/1989 | European Pat. Off. . | |
| 0407224 | 1/1991 | European Pat. Off. . | |
| 59-59734 | 4/1984 | Japan . | |
| 63-312350 | 12/1988 | Japan . | |
| WO85/05372 | 12/1985 | WIPO . | |
| WO87/00540 | 1/1987 | WIPO . | |

*Primary Examiner*—W. Robinson H. Clark
*Attorney, Agent, or Firm*—Cushman Darby & Cushman, L.L.P.

[57] ABSTRACT

A thermoplastic resin composition superior in impact resistance, heat resistance, flexural rigidity, processability and solvent resistance which comprises: (A) 100 parts by weight of a resin composition comprising 5–95% by weight of a polyphenylene ether, or a polyphenylene ether and polystyrene, and 95–5% by weight of a polyamide resin; (B) 5–50 parts by weight of a modified saturated rubber obtained by grafting 5–100 parts by weight of an aromatic vinyl compound on 100 parts by weight of a saturated type rubber and allowing 0.05–10 parts by weight of a compatibilizing agent to react with said rubber; and (c) 0.05–20 parts by weight of a compatibilizing agent.

5 Claims, No Drawings

THERMOPLASTIC RESIN COMPOSITION

This is a continuation of application Ser. No. 08/102,226, filed on Aug. 5, 1993, which was abandoned upon the filing hereof which is a continuation of Ser. No. 07/472,643, filed Jan. 30, 1990, now abandoned.

The present invention relates to a novel thermoplastic resin composition which can be made into shaped articles, sheets, films, etc. by injection molding, extrusion molding, etc.

More particularly, it relates to a novel thermoplastic resin composition which comprises a resin composition comprising a polyphenylene ether and a polyamide; a saturated rubber modified by grafting an aromatic vinyl compound onto a saturated rubber and further grafting thereon a compound used as a compatibilizing agent; and a compatibilizing agent. This composition is superior in heat resistance, mechanical properties, processability and solvent resistance.

Polyphenylene ether is a thermoplastic resin superior in various properties such as mechanical properties, heat resistance, cold resistance and dimensional stability. However, polyphenylene ether alone is considerably inferior in impact resistance and solvent resistance, and besides is inferior in processability owing to its high melt viscosity.

On the other hand, polyamide is a thermoplastic resin characterized by superior mechanical strength, solvent resistance and processability, but is inferior in impact resistance and heat resistance and besides extremely inferior in dimensional stability owing to its high water absorption. In order to make the best use of the characteristics of these resins and offset the defects, it has been proposed to blend these resins.

A resin composition comprising polyphenylene ether and polyamide has been known for a long time, and U.S. Pat. No. 3,379,792 discloses a composition comprising polyphenylene ether and up to 25% by weight of polyamide, but does not disclose a compatibilizing agent for compatibilizing polyphenylene ether and polyamide.

U.S. Pat. No. 4,315,086 discloses a liquid diene polymer, an epoxy compound and a compound having in molecule simultaneously (1) carbon-carbon double bond or carbon-carbon triple bond and (2) carboxyl, acid anhydride, acid amide, imide, carboxylic acid ester, amino or hydroxyl group. This patent specification further discloses rubbers such as ethylene/propylene rubber, ethylene/propylene/diene rubber or unsaturated carboxylic acid-modified products thereof, styrene butadiene rubber, polybutadiene, polystyrene-diene rubber-polystyrene diblock or triblock copolymers or partial hydrides thereof as impact strength modifiers. However, there are disclosed neither rubbers comprising a saturated rubber copolymerized with an aromatic vinyl compound nor these rubbers which have been further modified.

Japanese Patent Kokai No. 59-59724, U.S. Pat. No. 4,654,405 and WO87/00540 disclose a method of obtaining a composition by grafting an unsaturated carboxylic acid on a polyphenylene ether in the presence or absence of a free-radical initiator and then adding a polyamide to the graft polymer.

EP0046040 discloses a copolymer comprising a vinyl aromatic compound and an α-β unsaturated dicarboxylic anhydride or imide compound thereof as a compatibilizing agent for polyphenylene ether and polyamide.

WO85/05372 discloses polycarboxylic acids such as malic acid, U.S. Pat. No. 4,659,760 discloses oxidized polyethylene wax, U.S. Pat. No. 4,659,763 discloses quinones, U.S. Pat. No. 4,732,937 discloses polyphenylene ether made functional with epoxy compound, and U.S. Pat. No. 4,600,741 discloses polyfunctional compounds comprising acid halides such as anhydrous trimellitic acid chloride and carboxylic acids (anhydrides) as a compatibilizing agent for polyphenylene ether and polyamide. All of these compounds can be used as a compatibilizing agent in the present invention.

The object of the present invention is to obtain a composition comprising polyphenylene ether and polyamide which is superior in impact resistance, especially normal temperature and low temperature impact strength, heat resistance and flexural rigidity.

That is, as a result of the inventors' extensive and intensive research conducted to develop techniques effective in improvement of resin compositions comprising polyphenylene ether, polyamide, rubber-like materials and compatibilizing agents, it has been found that a novel thermoplastic resin composition superior in impact resistance characteristics, heat resistance and flexural rigidity and further in processability, solvent resistance and granulation stability, can be obtained by using, as a rubber-like material, an ethylene/α-olefin saturated copolymer rubbers modified by grafting an aromatic vinyl compound onto a saturated rubber and further grafting thereon a compound used as a compatibilizing agent.

The present invention relates to a thermoplastic resin composition superior in impact resistance, heat resistance and flexural rigidity and besides in processability and solvent resistance which comprises:

(A) 100 parts by weight of a resin composition comprising 5–95% by weight of a polyphenylene ether obtained by oxidation polymerization of at least one phenol compound represented by the following formula:

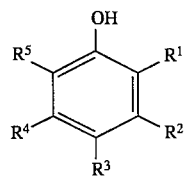

(wherein $R^1$, $R^2$, $R^3$, $R^4$ and $R^5$ each represent a hydrogen atom, a halogen atom or a substituted or unsubstituted hydrocarbon residue, and at least one of them is a hydrogen atom) or a polyphenylene ether-based resin composition comprising said polyphenylene ether and polystyrene, and (A') 95–5% by weight of a polyamide resin, (B) 5–50 parts by weight of a saturated rubber modified by grafting 5–100 parts by weight of an aromatic vinyl compound onto 100 parts by weight of a saturated rubber and allowing 0.05–10 parts by weight of a compatibilizing agent to react with said rubber, the grafting degree of said aromatic vinyl compound being at least 50% by weight, and (C) 0.05–20 parts by weight of a compatibilizing agent.

The polyphenylene ether (A) used in the present invention is a polymer obtained by oxidation polymerization of one or more phenol compounds represented by the following formula:

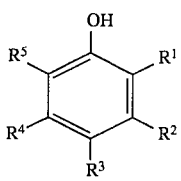

(wherein $R^1$, $R^2$, $R^3$, $R^4$ and $R^5$ each represents a hydrogen atom, a halogen atom or a substituted or unsubstituted hydrocarbon residue and at least one of them is a hydrogen atom) with oxygen or a gas containing oxygen using an oxidation coupling catalyst.

Examples of $R^1$, $R^2$, $R^3$, $R^4$ and $R^5$ in the above formula are hydrogen atom, chlorine atom, fluorine atom, bromine atom, iodine atom, methyl group, ethyl group, n- or isopropyl group, pri-, sec- or t- butyl group, chloroethyl group, hydroxyethyl group, phenylethyl group, benzyl group, hydroxymethyl group, carboxyethyl group, methoxycarbonylethyl group, cyanoethyl group, phenyl group, chlorophenyl group, methylphenyl group, dimethylphenyl group, ethylphenyl group and allyl group.

Examples of the phenol compounds as shown by the above formula are phenol, o-, m- or p-cresol, 2,6-, 2,5-, 2,4- or 3,5-dimethylphenol, 2-methyl-6-phenyl-phenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol and 2-methyl-6-allylphenol. Furthermore, the phenol compounds of the above formula may be copolymerized with other phenol compounds, for example, polyhydric hydroxy aromatic compounds such as hisphenol A, tetrabromobisphenol A, resorcin, hydroquinone and novolak resin.

Among them, preferred polyphenylene ethers are homopolymers of 2,6-dimethylphenol or 2,6-diphenylphenol and copolymers of a major part of 2,6-xylenol and a minor part of 3-methyl-6-t-butylphenol or 2,3,6-trimethylphenol.

Any oxidation coupling catalysts can be used for oxidation polymerization of the phenol compounds as far as they have polymerization ability. Typical examples thereof are cuprous salt/tert. amine such as cuprous chloride/ trimethylamine and cuprous chloride/pyridine; cupric salt/amine/ alkali metal hydroxide such as cupric chloride/pyridine/ potassium hydroxide; manganese salt/primary amine such as manganese chloride/ethanolamine and manganese acetate/ ethylenediamine; manganese salt/alcoholate or phenolate such as manganese chloride/sodium methylate and manganese chloride/sodium phenolate; and cobalt salt/tert. amine.

Reaction temperature of oxidation polymerization for obtaining polyphenylene may be higher than 40° C. (high temperature polymerization) or may be 40° C. or lower (low temperature polymerization) in the present invention, although properties of polymers produced depends upon temperature.

Thepolyphenylene ether-based resin composition used in the present invention includes mixtures of the above-mentioned polyphenylene ether and a styrenic polymer such as polystyrene and polyphenylene ethers grafted with other polymers. These can be prepared, for example, by graft polymerizing styrene monomer and/or other polymerizable monomer onto polyphenylene ether in the presence of an organic peroxide as disclosed in Japanese Patent Kokoku Nos. 47-47862, 48-12197, 49-5623, 52-38596 and 52-30991 or by melt-kneading polyphenylene ether and polystyrene in the presence of a free-radical initiator as disclosed in Japanese Patent Kokai No. 52-142799.

The polyamide (A) used in the present invention includes polyamides obtained by polycondensation of lactams of three or more membered ring, polymerizable ω-amino acids and dibasic acids with diamines. As examples of them, mention may be made of polymers of ε-caprolactam, aminocaproic acid, enantholactam, 7-aminoheptanoic acid, and 11-aminoundecanoic acid, polymers obtained by polycondensation of diamines such as hexamethylenediamine, nonamethylenediamine, undecamethylenediamine, dodecamethylenediamine and m-xylylenediamine with dicarboxylic acids such as terephthalic acid, isophthalic acid, adipic acid, sebacic acid, dibasic dodecanoic acid and glutaric acid, and copolymers thereof.

Typical examples of the polyamides are aliphatic polyamides such as polyamide 6, polyamide 6,6, polyamide 6,10, polyamide 11, polyamide 12 and polyamide 6,12 and aromatic polyamides such as polyhexamethylenediamine terephthalamide, polyhexamethylenediamine isophthalamide and xylene group-containing polyamides. These may be used singly or as mixtures or copolymers of two or more.

Mixing ratio of polyphenylene ether and polyamide in the resin composition (A) is suitably 5–95% by weight of polyphenylene ether and 95–5% by weight of polyamide. If amount of polyamide is less than 5% by weight, improvement in solvent resistance and processability is insufficient, and if it is more than 95% by weight, thermal properties such as heat distortion temperature are degraded.

As saturated rubbers (B), there may be used singly or in combination saturated rubbers among various rubbers used as impact strength modifiers for polyamide, polyphenylene ether, polystyrene, polyolefin, etc. Preferred are olefinic saturated rubbers such as ethylene-α-olefin saturated copolymer rubbers, propylene-butene copolymer rubbers and polyisobutylene. The α-olefin component includes any hydrocarbon compounds having 3–20 carbon atoms such as propylene, 1-butene, 1-pentene, 1-hexene, 1-heptene, styrene, p-isopropylstyrene and vinylcyclohexene. Among them, preferred are ethylene-propylene copolymer rubber and ethylene-1-butene copolymer rubber.

Unsaturated rubbers such as ethylene-α-olefin-non-conjugated polyene copolymer rubbers are not preferred because they are apt to gel upon graft polymerization of the aromatic vinyl compound or upon grafting reaction with a compound used as a compatibilizing agent.

The aromatic vinyl compounds to be grafted are those which are represented by the following formula:

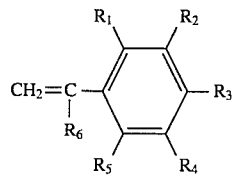

wherein R1, R2, R3, $R_4$ and $R_5$ each represents a hydrogen atom, a halogen atom, a substituted or unsubstituted hydrocarbon residue or a substituted or unsubstituted hydrocarbon oxy group, and $R_6$ represents a hydrogen atom or a lower alkyl group of 1–4 carbon atoms.

Examples of $R_1$, $R_2$, $R_3$, $R_4$ and $R_5$ in the above formula are hydrogen atom; halogen atoms such as chlorine, bromine and iodine; hydrocarbon residues such as methyl, ethyl, propyl, vinyl, allyl, benzyl and methylbenzyl; substituted hydrocarbon groups such as chloromethyl and bromomethyl; and substituted or unsubstituted hydrocarbon oxy groups such as methoxy, ethoxy, phenoxy and monochloromethoxy. Examples of $R_6$ are hydrogen atom and lower alkyl groups such as methyl and ethyl.

Examples of the aromatic vinyl compounds are styrene monomer, 2,4-dichlorostyrene, p-methoxystyrene, p-methylstyrene, p-phenylstyrene, p-divinylbenzene, p-(chloromethoxy)-styrene, α-methylstyrene, o-methyl-α-methylstyrene, m-methyl-α-methylstyrene, p-methyl-α-methylstyrene and p-methoxy-α-methylstyrene. These may be used singly or in combination of two or more. Among these monomers, preferred are styrene, p-methylstyrene and α-methylstyrene.

The aromatic vinyl compound can be grafted on the saturated rubber by any known polymerization methods such as suspension polymerization, emulsion polymerization, solution polymerization and bulk polymerization including those conducted in an extruder as well as a polymerization tank. In this case, amount of the aromatic vinyl compound grafted on the saturated rubber is 5–100 parts by weight per 100 parts by weight of the saturated rubber.

Compounds subjected to graft reaction with the above saturated rubber which was grafted with an aromatic vinyl compound are compatibilizing agents (C) referred to hereafter, and among these compatibilizing agents (C) preferred are:

(1) compounds which have in their molecule both at least one unsaturated bond, namely, carbon-carbon double bond or carbon-carbon triple bond and at least one polar group;

(2) compounds which have in their molecule both (i) —OR (R is hydrogen, alkyl, aryl, acyl, carbonyl or dioxy group) and (ii) at least two of same or different functional groups selected from carboxyl, acid halide, acid anhydride, annhydrous acid halide, acid ester, acid amide imide, amino groups and salts thereof;

(3) compounds which have in their molecule both (i) at least one acid halide group and (ii) at least one of carboxyl group, acid anhydride group, acid ester group and acid amide group; and (4) organosilane compounds.

Examples of these compounds will be mentioned with reference to compatibilizing agent (C) hereinafter, but as preferred examples, mention may be made of maleic anhydride, maleic acid, chloromaleic anhydride, maleimide, N-aromatic maleimide, N-aliphatic maleimide, fumaric acid, acrylic acid, methacrylic acid, acrylamide, methacrylamide, N-methylolacrylamide, itaconic acid, itaconic anhydride, crotonic acid, methyl acrylate, ethyl acrylate, butyl acrylate, methyl methacrylate, ethyl methacrylate, butyl methacrylate, maleic hydrazide, reaction products of maleic anhydride with diamines, endo methylene-tetrahydro phthalic anhydride, dimethylaminopropyl-acrylamide, 7-amino-3,7-dimethyloctyl acrylate, 2-cyanomethyl acrylate, tetrahydrofurfuryl acrylate, glycidyl acrylate, glycidyl methacrylate, allyl-glycidyl ether and endo methylene-tetrahydrophthalic acid chloride. Especially preferred are maleic anhydride, methacrylamide, N-methylolacrylamide and allylglycidyl ether.

Graft reaction of the compatibilizing agent (C) with the grafted saturated rubber can be carried out by any methods. These methods include copolymerization and reactions with main chain, side chain or terminal of molecule. Specifically, a method in which the saturated rubber and the compatibilizing agent (C) are mixed in the form of solution and the solvent is evaporated or in which they are precipitated in non-solvent may effectively be employed. However, from industrial viewpoint, a method of melt kneading them is employed in practice.

Melt-kneading can be carried out by kneading machines such as single-screw or twin-screw extruders which are ordinarily used and various kneaders.

The grafting of the aromatic vinyl compound and the reaction with the compatibilizing agent (C) may be carried out in one step.

Amount of the aromatic vinyl compound is 5–100 parts by weight based on the saturated rubber. If the amount is less than 5 parts by weight, compatibility or dispersibility of polyphenylene ether resin and modified saturated rubber is deteriorated, resulting in insufficient impact resistance, heat resistance and flexural rigidity. If it is more than 100 parts by weight, homopolymer of ungrafted aromatic vinyl compound much occurs upon grafting the aromatic vinyl compound, and this homopolymer is so compatibilized with polyphenylene ether resin as to cause reduction of heat resistance of the resultant polyphenylene ether-polyamide composition. On the other hand, it is necessary that grafting degree of aromatic vinyl compound, which is calculated by (total amount of polystyrene—amount of homopolystyrene)/ total amount of polystyrene, is at least 50% by weight. If the grafting degree is less than 50% by weight, compatibility between polyphenylene ether resin and modified saturated rubber is lowered and this is not preferred with respect to impact resistance. Moreover, phase separation is apt to occur in injection molded product.

Amount of the compatibilizing agent (C) is 0.05–10 parts by weight, preferably 0.05–5 parts by weight, more preferably 0.1–2 parts by weight per 100 parts by weight of the saturated rubber. If the amount of the compatibilizing agent (C) is less than 0.05 part by weight, granulation of the resultant alloy cannot be conducted stably or impact strength decreases. If it is more than 10 parts by weight, appearance of the alloy becomes extremely poor.

Compatibilizing agent (C) used in the present invention is not specifically limited and may be selected from the known compatibilizing agents.

Examples thereof are (1) liquid diene polymers, (2) epoxy compounds having no ethylenically or acetylenically unsaturated bond, (3) compounds having in their molecule both (i) carbon-carbon double bond or triple bond and (ii) at least one polar group, (4) oxidized polyethylene wax, (5) quinones, (6) organosilane compounds, (7) compounds having in their molecule both (i) —OR (R is hydrogen atom, alkyl group, aryl group, acyl group or carbonyldioxy group) and (ii) at least two of different or same functional groups selected from carboxyl group, acid halide group, acid anhydride group, anhydrous acid halide group, acid ester group, acid amide group, imide group, amino group and salts thereof, and (8) compounds having in their molecule both (i) at least one acid halide group and (ii) at least one of carboxyl group, carboxylic acid anhydride group, acid ester group and acid amide group.

In addition, (9) polyphenylene ether which has been made functional by previously reacting these compatibilizing agents with polyphenylene ether and (10) melt kneaded products of the polyphenylene ether made functional and a small amount of polyamide, may also be used as a compatibilizing agent.

These compatibilizing agents will be explained below specifically regarding the respective groups enumerated above:

(1) Homopolymers of a conjugated diene and copolymers of one conjugated diene with other conjugated dienes or vinyl monomers such as polybutadiene, polyisoprene, butylene-isoprene copolymer and styrene-butadiene copolymer. Number-average molecular weight thereof is 150–10,000, preferably 150–5,000.

(2) Condensates of polyhydric phenols (such as bisphenol A, tetrabromobisphenol A and resorcin) with epichlorohydrin, condensates of polyhydric alcohols such as ethylene glycol, propylene glycol and polyethylene glycol with epichlorohydrin, and the like.

(3) Compounds having a carbon-carbon double bond and a functional group having affinity or reactivity with polyamide. Examples of the functional group are carboxyl group, carboxylic acid derivative group such as salt, ester, acid amide, acid anhydride, imide, acid azide and acid halide, oxazoline group, nitrile group, epoxy group, amino group, hydroxyl group, isocyanic acid ester group and isocyanate group.

Examples of the compounds are maleic anhydride, endo methylene-tetra-hydro phthalic anhydride, maleic acid, fumaric acid, maleimide, maleic acid hydrazide, reaction products of maleic anhydride and diamine, for example, compounds having the formulas;

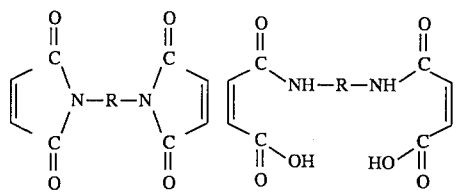

wherein R is an aliphatic or aromatic group; methylnadic anhydride, dichloromaleic anhydride, maleic acid amide, natural fats and oils such as soybean oil, tung oil, caster oil, linseed oil, hempseed oil, cottonseed oil, sesame oil, rapeseed oil, peanut oil, camellia oil, olive oil, coconut oil and sardine oil; epoxidized natural fats and oils such as epoxidized soybean oil; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9 -undecenoic acid, 10 -undecenoic acid, 4 -dodecenoic acid, 5-dodecenoic acid, 4 -tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienoic acid, 2,4 -hexadienoic acid, diallyl-acetic acid, geranic acid, 2,4-decadienoic acid, 2,4-dodecadienoic acid, 9,12-hexadecadienoic acid, 9,12-octadecadienoic acid, hexadecatrienoic acid, lonolic acid, linolenic acid, octadecatrienoic acid, eicosadienoic acid, eicosatrienoic acid, eicosatetraenoic acid, ricinoleic acid, eleosteric acid, oleic acid, eicosapentaenoic acid, erucinic acid, docosadienoic acid, docosatrienoic acid, docosatetraenoic acid, docosapentaenoic acid, tetracosenoic acid, hexacosenoic acid, hexacodienoic acid, octacosenoic acid and triacontenoic acid; and esters, acid amides and anhydrides of these unsaturated carboxylic acids.

As the epoxy compounds, mention may be made of unsaturated glycidyl esters and unsaturated glycidyl ethers represented by the following formulas (1) and (2).

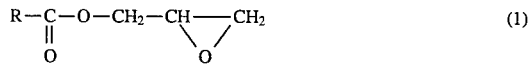

wherein R is a hydrocarbon (residue of 2–18 carbon atoms which has an ethylenic unsaturated bond) and

wherein R is a hydrocarbon residue of 2–18 carbon atoms which has an ethylenic unsaturated bond, and X is —CH$_2$, —O—, or

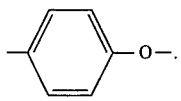

Examples thereof are glycidyl acrylate, glycidyl methacrylate, itaconic acid glycidyl esters, allylglycidyl ether, 2-methylallylglycidyl ether and styrene-p-glycidyl ether.

Further examples are unsaturated alcohols such as allyl alcohol, crotyl alcohol, methylvinyl carbinol, allyl carbinol, methylpropenyl carbinol, 4-pentene-1-ol, 10-undecene-1-ol, propargyl alcohol, 1,4-pentadiene-3-ol, 1,4-hexadiene- 3-ol, 3,5-hexadiene-2-ol, 2,4-hexadiene-1-ol, alcohols represented by the formulas $C_nH_{2n-5}OH$, $C_nH_{2n-7}OH$ or $C_nH_{2n-9}OH$ (n is a positive integer), 3-butene-1,2-diol, 2,5-dimethyl-3-hexene-2,5-diol, 1,5-hexadiene-3,4-diol and 2,6-octadiene-4,5-diol, and unsaturated amines such as ones where an OH group of these unsaturated alcohols is replaced by an —NH$_2$ group. Moreover, polymers and rubbers of low molecular weight, e.g., 500–10,000 in which the above compatibilizing agents are introduced are also included.

Compounds further include those which have two or more of the functional groups and two or more of the unsaturated groups.

Among them, preferred are maleic anhydride, maleic acid, fumaric acid, itaconic anhydride, itaconic acid and glycidyl acrylate or methacrylate, and more preferred are maleic anhydride and fumaric acid.

(5) 1,2- and 1,4-benzoquinones, 2,6-diphenylquinone, 2-chloro-1,4-benzoquinone, and the like.

(6) Compounds which have in their molecule at least one silicon atom and at least one carbon-carbon double or triple bond and/or a functional group of amine or mercapto which does not directly bond to the silicon atom. Examples are Υ-aminopropyltriethoxysilane and 2-(3-cyclohexyl)ethyltrimethoxysilane.

(7) Aliphatic polycarboxylic acids, their acid esters and acid amides. These may have the following formula:

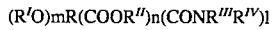

wherein R represents a linear or branched saturated aliphatic hydrocarbon residue having 2–20, preferably 2–10 carbon atoms; $R'$ represents a hydrogen atom or an alkyl, aryl, acyl or carbonyldioxy group having 1–10, preferably 1–6, more preferably 1–4 carbon atoms and is most preferably hydrogen atom; $R''$ represents a hydrogen atom or an alkyl or aryl group having 1–20, preferably 1–10 carbon atoms; $R'''$ and $R^{IV}$ each independently represents a hydrogen atom or an alkyl or aryl group having 1–10, preferably 1–6, most preferably 1–4 carbon atoms; m is 1, (n+l) is 2 or more and preferably 2 or 3, and n and l each is 0 or more; (OR') is attached to α or β position relative to carbonyl group and at least two carbonyl groups are isolated by 2–6 carbon atoms.

Examples of these compounds are malic acid and agaricic acid. Further, anhydrides and hydrates of these polycarboxylic acids may also be used. Examples of acid esters are acetyl citrate and mono- or distearyl citrate. Examples of acid amides are N,N'-diethylcitric acid amide and N-dodecylcitric acid amide.

Furthermore, derivatives of the above polycarboxylic acids, especially salts thereof may also be used.

(8) Compounds having in their molecule at least one acid halide group, most preferably acid chloride group, and at least one carboxyl group, carboxylic acid anhydride group, acid ester group or acid amide group, preferably carboxylic acid group or acid anhydride group.

Examples thereof are trimellitic acid chloride, anhydrous trimellitic acid chloride and endo methylene-tetra-hydro phthalic acid chloride.

Maleic anhydride and maleic acid are preferred among the compounds of (1)–(8). Addition amount is preferably 0.05–20 parts by weight, and outside this range, impact strength cannot be sufficiently improved.

The thermoplastic resin composition of the present invention may further contain an inorganic filler in an amount of about 1–70 parts by weight per 100 parts of the composition. Preferable inorganic fillers include, for example, talc, mica, titanium oxide, clay, magnesium hydroxide, glass fibers, potassium titanate whiskers and carbon fibers.

In the present invention, there may be further added usually employed additives such as heat stabilizer, flame retarder, pigment, lubricant and ultraviolet absorber. Furthermore, fiberous reinforcing agents such as alumina fiber may also be added.

The method for making the resin composition of the present invention is not critical and may be any known methods.

A method in which the components are mixed in the form of solutions and solvents are evaporated or a method in which said mixture is precipitated in a non-solvent is effective. However, from industrial viewpoint, a method of kneading them in molten state is employed in practice. The melt kneading is carried out using such kneading machines as generally used single-screw or twin-screw extruders and various kneaders. A twin-screw high performance extruder is especially preferred.

Before kneading, it is preferred to uniformly blend respective resin components in the form of powder or pellet by using such a mixer as a tumbler or a Henschel Mixer. However, each resin may be separately fed directly to a kneading apparatus through a metering device without the blending.

The kneaded resin composition can be molded by injection molding, extrusion molding or various other molding methods. The present invention further includes a method in which molded articles are obtained by dry-blending the components at the beginning of injection molding or extrusion molding and then directly kneading the components during the operation of melt processing, without the previous kneading.

There in no special limitation in sequence of kneading of the components. That is, (A), (B) and (C) may be kneaded at the same time or (A) and (B) are previously kneaded and then (C) may be kneaded with the kneaded composition of (A) and (B). Alternatively, polyphenylene ether resin is previously kneaded with (B) and (C) and then polyamide resin may be kneaded therewith. Other sequences of kneading may also be employed.

The present invention will be explained in more detail by the following examples, but these are mere illustration of the present invention and the present invention is not restricted to them.

M.I. (melt index), H.D.T. (heat distortion temperature), Izod impact strength (3.2 mm thick) and flexural modulus (3.2 mm thick) are observed in accordance with JIS K7210, JIS K7207, JIS K7110 and JIS K7203, respectively.

Polyphenylene ether, styrene-grafted ethylene-propylene rubber, and modified styrene-grafted ethylene-propylene rubber used in the examples and comparative examples were prepared by the following processes, and maleic anhydride and polyamide used were commercially available ones.

(1) Polyphenylene ether:

Xylene (3,420 g), methanol (1,366 g), 2,6-dimethylphenol (1,222 g, 10 mols) and sodium hydroxide (24 g, 0.6 mol) were charged in a jacketed autoclave of 10 liter which was equipped with a stirrer, a thermometer, a condenser and an air introduction pipe which reached the bottom of the autoclave, and a uniform solution was prepared. To this solution was added a solution prepared by dissolving diethanolamine (31.5 g, 0.3 mol), di-n-butylamine (19.4 g, 0.15 mol) and manganese chloride tetrahydrate (0.99 g, 0.005 mol) in methanol (100 g).

Then, air was blown into the autoclave at a rate of 5 liter/min with vigorously stirring the content. Reaction temperature and pressure were kept at 35° C. and 9 kg/cm, respectively.

After lapse of 7 hours from starting of air blowing, feed of air was discontinued, and the reaction mixture was introduced into a mixture of acetic acid (66 g, 1.15 mol) and methanol (4,900 g). The resulting slurry was filtered under reduced pressure, and polyphenylene ether in wet state was isolated. The isolated polyphenylene ether was washed with methanol (7,200 g) and dried under reduced pressure at 150° C. overnight to obtain dry polyphenylene ether (1,179 g). Reduced viscosity was 0.54 dl/g, measured in chloroform of 0.5 g/dl in concentration at 25° C.

(2) Preparation Example A of styrene-grafted ethylene-propylene rubber:

Pellets (100 g) of ethylene-propylene copolymer (ESPRENE® E-120P manufactured by Sumitomo Chemical Co., Ltd.) and water (350 g) were charged in a glass autoclave of 1.0 liter. With stirring, thereto were added, in succession, a solution prepared by dissolving benzoyl peroxide (0.75 g) in styrene (70 g) and a solution prepared by dissolving polyvinyl alcohol (4.0 g, GOSENOL® GL-05 manufactured by Nippon Synthetic Chemical Industry Co., Ltd.) in water (100 g) as a dispersion stabilizer, and the stirring was continued for further 1 hour to impregnate the ethylene-propylene copolymer pellets with the solutions. Then, reaction was allowed to proceed for 6 hours at 90° C. and for 2 hours at 115° C. and after termination of the reaction, the reaction product was subjected to filtration, washing with water and vacuum drying to obtain a styrene-grafted saturated rubber pellets (EPS-A) (157 g).

Preparation Example B of styrene-grafted ethylene-propylene rubber:

The same ethylene-propylene copolymer pellets (100 g) as used in Preparation Example A and water (350 g) were charged in a glass autoclave of 1.0 liter. With stirring, thereto were added a solution prepared by dissolving benzoyl peroxide (0.65 g) in styrene (30 g) and a solution prepared by dissolving the same polyvinyl alcohol (4.0 g) as used in Preparation Example A in water (100 g) as a dispersion stabilizer in succession, and impregnation and reaction were carried out under the same conditions as in Preparation Example A. After termination of the reaction, filtration, washing with water and vacuum drying were conducted to obtain styrene-grafted saturated rubber pellets (EPS-B) (125 g).

Preparation Example C of styrene-grafted ethylene-propylene-dicyclopentadiene rubber:

Ethylene-propylene-dicyclopentadiene terpolymer (ESPRENE® E-306 manufactured by Sumitomo Chemical Co., Ltd.) ground into particles of smaller than 5 mm square (100 g) and water (350 g) were charged in a glass autoclave of 1.0 liter. With stirring, thereto were added a solution prepared by dissolving benzoyl peroxide (0.65 g) in styrene (30 g) and a solution prepared by dissolving the same polyvinyl alcohol (4.0 g) as used in Preparation Example A in water (100 g) as a dispersion stabilizer in succession. Then, impregnation and reaction were carried out under the same conditions as in Preparation Example A. After termination of the reaction, the reaction product was subjected to filtration, washing with water and vacuum drying to obtain styrene-grafted unsaturated rubber pellets (EPS-C) (127 g). Preparation Example D of styrene-grafted ethylene-propylene rubber:

Styrene-grafted saturated rubber pellets (EPS-D) (175 g) were prepared in the same manner as in Preparation Example A except that the polymerization temperature and time for grafting of styrene were 70° C. and 6 hours, respectively.

Results of analyses of styrene-grafted rubbers obtained in Preparation Examples A, B, C, and D are shown in Table 1.

TABLE 1

| Preparation Example (EPS- ) | Content of polystyrene part in styrene-grafted rubber (%) | Content of homopolystyrene (*) (%) | Grafting degree (*) (%) |
| --- | --- | --- | --- |
| A | 36 | 43 | 57 |
| B | 20 | 33 | 67 |
| C | 21 | 20 | 80 |
| D | 36 | 70 | 30 |

(*): Amount of homopolystyrene was measured by extracting homopolystyrene with methyl ethyl ketone.

$$\text{Content of homopolystyrene} = \frac{\text{Amount of homopolystyrene}}{\text{Total amount of polystyrene}}$$

$$\text{Grafting degree} = \frac{\text{Total amount of polystyrene} - \text{Amount of homopolystyrene}}{\text{Total amount of polystyrene}}$$

(3) Method of preparation of modified styrene-grafted ethylene-propylene rubber and others:

Styrene-grafted ethylene-propylene rubber (EPS-A, B, C, or D), maleic anhydride and tert-butyl peroxylaurate were previously mixed. The mixture was subjected to reaction in an extruder of 30 mmφ in screw diameter and L/D=28 at a barrel temperature of 230° C. and at a screw rotation of 60 rpm, and modified rubber strand discharged from die was cooled with water and pelletized to obtain modified styrene-grafted ethylene propylene rubber.

(4) Polyamide:

The following commercially available polyamide was used.

UNITIKA Nylon 6 A1030BRL

Number-average molecular weight: 17500

Example 1

Maleic anhydride modified styrene-grafted ethylene propylene rubber (referred to as (M-EPS(1)) was prepared from styrene-grafted ethylene-propylene rubber (EPS-B) (100 parts by weight) obtained in Preparation Example B, maleic anhydride (0.7 part by weight) and tert-butyl peroxylaurate (0.1 part by weight).

Then, polyphenylene ether, M-EPS (1) and maleic anhydride were charged to a twin-screw kneader (TEX-44® manufactured by The Japan Steel Work Ltd.) through the first hopper, and polyamide 6 (UNITIKA Nylon 6® 1030BRL) was charged to the kneader through the second hopper located between the first hopper and the air vent, and kneading and granulation was carried out. Kneading and granulation were carried out at the composition of 0.6 part by weight of maleic anhydride per 100 parts by weight of polyphenylene ether: 50 wt %, M-EPS(1): 10 wt % and polyamide 6:40 wt %. Kneading condition were at a cylinder temperature of 260° C. and a screw rotation of 380 rpm.

The resulting composition was dried and molded into test pieces by an injection molding machine (Toshiba IS-150EV) under conditions of a set temperature of 290° C. and a mold temperature of 80° C.

Results of measurement of properties are shown in Tables 2–4.

Comparative Example 1

Example 1 was repeated except that styrene-grafted ethylene-propylene rubber (EPS-B) which was not modified with maleic anhydride was used in place of M-EPS(1).

Comparative Example 2

Example 1 was repeated except that maleic anhydride-modified ethylene-propylene rubber (hereinafter referred to as M-EPR) in which maleic anhydride was in an amount of 0.7 part by weight per 100 parts by weight of rubber, was used in place of M-EPS (1).

Results obtained in Comparative Examples 1 and 2 are shown in Table 2.

It can be seen that the results of comparative Example 1 were inferior in Izod impact strength, and those of Comparative Example 2 were inferior in heat resistance and flexural modulus to those of Example 1.

Furthermore, as shown in Table 3, use of maleic anhydride-modified M-EPS(1) resulted in better granulation stability in formation of the alloy.

EXAMPLE 2

Example 1 was repeated except that styrene-grafted ethylene-propylene rubber (EPS-A) obtained in Preparation Example A was used in place of EPS-B. The results are shown in Table 2.

This maleic anhydride-modified EPS-A was referred to as M-EPS(2).

Comparative Example 3

Example 1 was repeated except that styrene-grafted ethylene-propylene-dicyclopentadiene rubber (EPS-C) obtained in Preparation Example C was used in place of EPS-B. The results are shown in Tables 2 and 4. The maleic anhydride-modified EPS-C was referred to as M-EPS(3).

EXAMPLES 3 and 4

Example 1 was repeated except that amount of M-EPS(1) added was changed to 15 wt % (Example 3) and 5 wt % (Example 4). The results are shown in Table 2.

Comparative Example 4

Example 1 was repeated except that amount of M-EPS(1) was changed to 2 wt %. The results are shown in Table 2.

As can be seen from Comparative Example 3 and Example 1, when copolymerization and formation of modified alloy were carried out using ethylene-propylene-dicyclopentadiene rubber as a base, crosslinking of double bond simultaneously occurred, resulting in reduction in fluidity of the resultant alloy and in impact strength. Further as shown in Table 4, surface impact test was conducted at a strain rate of 1.1 m/sec at −30° C. Table 4 shows that the sample of The results are shown in Table 5.

TABLE 2

| | Composition | | | | M.I. 280° C. 10 kg load (g/10 min.) | Izod impact strength (with notch) | | H.D.T. (18.6 kg/cm$^2$) °C. | Flexural modulus kg/cm$^2$ |
|---|---|---|---|---|---|---|---|---|---|
| | Polyphenylene ether wt % | Rubber | Maleic anhydride Part by weight | Nylon 6 wt % | | 23° C. kg cm/cm | −30° C. kg cm/cm | | |
| Example 1 | 50 | M-EPS (1) 10 wt % | 0.6 | 40 | 36 | 60 | 18 | 119 | 21000 |
| Comparative Example 1 | 50 | EPS-B 10 | 0.6 | 40 | 42 | 50 | 15 | 135 | 22000 |
| Comparative Example 2 | 50 | M-EPR 10 | 0.6 | 40 | 40 | 70 | 15 | 100 | 20000 |
| Example 2 | 50 | M-EPS (2) 10 | 0.6 | 40 | 50 | 26 | 9 | 123 | 22200 |
| Comparative Example 3 | 50 | M-EPS (3) 10 | 0.6 | 40 | 29 | 54 | 11 | 114 | 23600 |
| Example 3 | 45 | M-EPS (1) 15 | 0.6 | 40 | 30 | 63 | 20 | 115 | 20400 |
| Example 4 | 55 | M-EPS (1) 5 | 0.6 | 40 | 40 | 30 | 10 | 140 | 25200 |
| Comparative Example 4 | 58 | M-EPS (1) 2 | 0.6 | 40 | 43 | 8 | 5 | 148 | 26000 |
| Comparative Example 5 | 50 | M-EPS (4) 10 | 0.6 | 40 | 54 | 11 | 6 | 125 | 22000 |

Example 1 showed ductile fracture behavior, but the sample of Comparative Example 3 showed brittle fracture behavior.

Consequently, unsaturated rubbers are not preferred and saturated type rubbers are superior.

It can be also seen from Examples 1 and 2 that impact strength changed depending on content of polystyrene, and with increase in polystyrene content, impact strength decreased. Polystyrene content is preferably 40 wt % or lower, more preferably 20 wt % or lower.

It is further recognized from Examples 1, 3 and 4 and Comparative Example 4 that content of M-EPS is preferably 5 wt % or higher.

Comparative Example 5

Example 1 was repeated except that EPS-D was used as styrene-grafted ethylenepropylene rubber in place of EPS-B. Modified EPS-D was referred to as M-EPS(4). The results are shown in Table 2. A rubber of 30% in grafting degree was found to be much deteriorated in properties and was not preferred.

EXAMPLES 5–8

Example 1 was repeated except that allylglycidyl ether (M-EPS(5)) in Example 5, acrylamide (M-EPS(6)) in Example 6, N-methylol-acrylamide (M-EPS(7)) in Example 7 and endo methylene-tetra-hydro phthalic anhydride (M-EPS (8)) in Example 8 were used in place of maleic anhydride and composition of polymers were changed. The results are shown in Table 5.

Comparative Example 6

As comparative examples for Examples 5–8, unmodified EPS(EPS-B) was used as rubber. Composition was the same as in Examples 5–8.

TABLE 3

| | Rubber | Modification of rubber | Granulation stability |
|---|---|---|---|
| Example 1 | M-EPS (1) | Maleic anhydride | Good |
| Comparative Example 1 | EPS (B) | — | Bad |
| Comparative Example 2 | M-EPR | Maleic anhydride | Good |

TABLE 4

| | Rubber | Modification of rubber | Surface impact behavior, −30° C., 1.1 m/sec |
|---|---|---|---|
| Example 1 | Saturated rubber (EPM) | Maleic anhydride and styrene | Ductile fracture |
| Comparative Example 3 | Unsaturated rubber (EPDM) | Maleic anhydride and styrene | Brittle fracture |

TABLE 5

| | Composition | | | | M.I. | Izod impact | | H.D.T. | |
|---|---|---|---|---|---|---|---|---|---|
| | | | | | 280° C. 10 kg load | strength (with notch) | | (18.6 | Flexural |
| | Polyphenylene ether wt % | Saturated rubber wt % | Maleic anhydride Part by weight | Nylon 6 wt % | (g/10 min.) | 23° C. kg cm/cm | −30° C. kg cm/cm | kg/cm²) °C. | modulus kg/cm² |
| Example 5 | 42 | 14 M-EPS (5) | 0.6 | 44 | 38 | 60 | 20 | 120 | 20400 |
| Example 6 | 42 | 14 M-EPS (6) | 0.6 | 44 | 35 | 60 | 22 | 126 | 20400 |
| Example 7 | 42 | 14 M-EPS (7) | 0.6 | 44 | 37 | 55 | 20 | 123 | 20800 |
| Example 8 | 42 | 14 M-EPS (8) | 0.6 | 44 | 35 | 55 | 19 | 124 | 20300 |
| Comparative Example 6 | 42 | 14 EPS-B | 0.6 | 44 | 36 | 56 | 17 | 120 | 20700 |

M-EPS (5) Allylglycidyl ether modified EPS-B
M-EPS (6) Acrylamide modified EPS-B
M-EPS (7) N-methylolacrylamide modified EPS-B
M-EPS (8) Endo methylene-tetra-hydrophthalic anhydride-modified EPS-B The thermoplastic resin composition of the present invention is characterized in that a modified saturated rubber obtained by grafting an aromatic vinyl compound onto a saturated rubber and further grafting thereon a compound used as a compatibilizing agent and also a compatibilizing agent per se are blended with a polyphenylene ether and a polyamide at specific ratio. The composition is excellent in balance of heat resistance, impact resistance and flexural rigidity and superior in processability and granulation stability and thus can be used for various purposes.

The novel resin composition provided by the present invention can be easily processed into molded articles, sheets, films, etc., by processing methods employed for thermoplastic resin, e.g., injection molding, extrusion molding, etc. These products are very good in balance of heat resistance, impact resistance and flexural rigidity, and especially effective for injection molding.

We claim:

1. A process for preparing a thermoplastic resin composition which comprises melt-blending:

(A) 5–95 parts by weight of a polyphenylene ether obtained by oxidation polymerization of at least one phenol compound represented by the following formula:

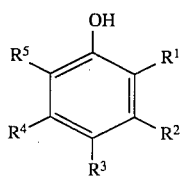

wherein $R^1$, $R^2$, $R^3$, $R^4$, and $R^5$ each represent a hydrogen atom, a halogen atom or a substituted or unsubstituted hydrocarbon group and at least one of them is a hydrogen atom, or a polyphenylene ether-based resin composition comprising said polyphenylene ether and polystyrene, (A') 95–5 parts by weight of a polyamide resin, (B) 5–50 parts by weight of a saturated rubber modified by grafting 5–100 parts by weight of an aromatic vinyl compound onto 100 parts by weight of a saturated rubber and allowing 0.05–10 parts by weight of at least one compound selected from the group consisting of unsaturated carboxylic acids and unsaturated carboxylic anhydrides having a reactive unsaturated bond to react with said rubber, the grafting degree of said aromatic vinyl compound being 50% by weight or more, wherein said grafting degree is determined according to the formula:

$$\text{Grafting degree} = \frac{\text{(total amount of polystyrene} - \text{amount of homopolystyrene)}}{\text{total amount of polystyrene}}$$

and wherein said saturated rubber is at least one rubber selected from the group consisting of ethylene-propylene copolymer rubber and ethylene-1-butene copolymer rubber, and (C) 0.05–20 parts by weight of at least one compatibilizing agent selected from the group consisting of:
     maleic anhydride, fumaric acid, acrylamide, endo methylene-tetra-hydro phthalic anhydride, and derivatives thereof.

2. A process for preparing a thermoplastic resin composition according to claim 1, further comprising the step of melt-blending at least one compound selected from the group consisting of styrene, vinyltoluene and α-methylstyrene as the aromatic vinyl compound of (B).

3. A process for preparing a thermoplastic resin composition according to claim 1, further comprising the step of melt-blending about 1–70 parts by weight of an inorganic filler per 100 parts by weight of the thermoplastic resin composition.

4. A process for preparing a thermoplastic resin composition according to claim 1, further comprising the step of melt-blending at least one member selected from the group consisting of talc, mica, titanium oxide, clay, magnesium hydroxide, glass fibers, potassium titanate whiskers and carbon fibers as the inorganic filler.

5. A process for preparing a thermoplastic resin composition according to claim 1, further comprising the step of melt-blending an ethylene-propylene copolymer rubber as said saturated rubber.

* * * * *